(12) United States Patent
Wolff

(10) Patent No.: US 7,000,997 B1
(45) Date of Patent: Feb. 21, 2006

(54) CONTROL UNIT FOR A WHEEL BRAKE OF A MOTOR VEHICLE

(75) Inventor: Guenter Wolff, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 10/110,574

(22) PCT Filed: Sep. 15, 2000

(86) PCT No.: PCT/DE00/03216

§ 371 (c)(1),
(2), (4) Date: May 3, 2004

(87) PCT Pub. No.: WO01/28834

PCT Pub. Date: Apr. 26, 2001

(30) Foreign Application Priority Data

Oct. 15, 1999 (DE) ................................. 199 49 817

(51) Int. Cl.
*B60T 8/40* (2006.01)
(52) U.S. Cl. ............................. 303/116.1; 303/113.1; 303/115.4; 303/119.2; 303/11; 303/20
(58) Field of Classification Search ................ 303/3, 303/9.62, 9.73, 113.1, 189, 9.74, 9.75, 10, 303/16, 113.4, 115.2, 115.4, 116.1, 116.2, 303/116.4, 119.1, 119.2, 119.3, 22.1, 11, 303/20

See application file for complete search history.

(56) References Cited

U.S. PATENT DOCUMENTS

| | | | | |
|---|---|---|---|---|
| 5,221,129 A | * | 6/1993 | Takasaki | .................. 303/119.2 |
| 5,281,007 A | * | 1/1994 | Brainard | ....................... 303/11 |
| 5,855,417 A | * | 1/1999 | Johnston et al. | ................ 303/3 |
| 6,179,389 B1 | * | 1/2001 | Freitag et al. | .................. 303/2 |
| 6,312,062 B1 | * | 11/2001 | Hashida | .................... 303/113.2 |
| 6,431,661 B1 | * | 8/2002 | Meyer | ....................... 303/9.61 |
| 6,474,749 B1 | * | 11/2002 | Trzmiel et al. | ........... 303/113.3 |
| 6,491,353 B1 | * | 12/2002 | Hackl | ........................... 303/10 |

(Continued)

FOREIGN PATENT DOCUMENTS

| | | | |
|---|---|---|---|
| DE | 195 27 936 A | | 1/1997 |
| DE | 19527936 | * | 1/1997 |
| EP | 0 025 714 A | | 3/1981 |
| WO | 92 00211 A | | 1/1992 |

OTHER PUBLICATIONS

Werner Goetz: "Hydraulik in Theorie Und Praxis", 1995, Bosch, Stuttgart XP00216258, p. 178, p. 187.*

(Continued)

*Primary Examiner*—Devon C. Kramer
(74) *Attorney, Agent, or Firm*—Michael J. Striker

(57) ABSTRACT

An actuating unit (1) for a wheel brake (2) of a motor vehicle has a hydraulic pump (14) that can be driven at variable speeds by an electric motor (13). In addition, a cylinder-piston unit (3) is provided, with a piston (6) and with cylinder chambers (7, 8) disposed on both sides of the piston. By means of the cylinder-piston unit (3), a brake lining (9) can be pressed against and lifted away from a friction element (10) connected to a vehicle wheel. A 4/3-port directional-control valve (15) is provided between the pump (14) and the cylinder-piston unit (3) and is used to modulate the pressure in the cylinder-piston unit. The actuating unit (1) is associated with a control unit (29), which can process an electric brake request signal and can control the electric motor (13) and the valve (15).

4 Claims, 1 Drawing Sheet

U.S. PATENT DOCUMENTS

| | | | | |
|---|---|---|---|---|
| 6,623,087 B1 * | 9/2003 | Wolff | .......................... | 303/10 |
| 6,692,087 B1 * | 2/2004 | Wolff | .......................... | 303/10 |
| 2003/0173824 A1 * | 9/2003 | Ishimaru et al. | ................ | 303/3 |
| 2003/0201668 A1 * | 10/2003 | Kim | ............................ | 303/10 |

OTHER PUBLICATIONS

Werner Goetz: "Elektrohydraulische Proportional . . . ", 1989, Bosch, Stuttgart XP002161259, p. 76.

* cited by examiner

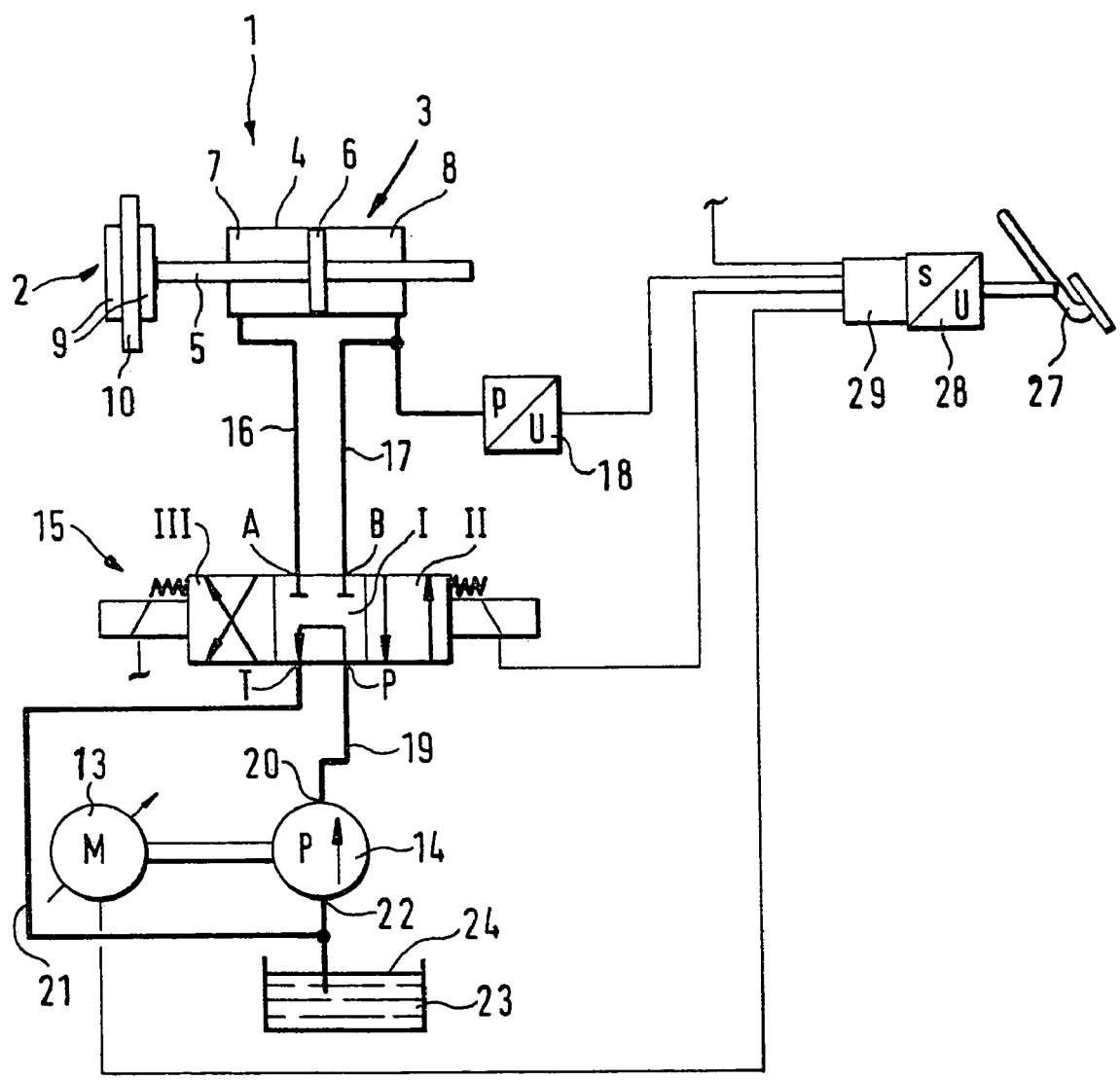

CONTROL UNIT FOR A WHEEL BRAKE OF A MOTOR VEHICLE

BACKGROUND OF THE INVENTION

The invention is based on an actuating unit.

An actuating unit of this kind for a wheel brake of a motor vehicle has already been disclosed (EP 0 025 714 A1), in which a hydraulic pump that is driven by an electric motor aspirates pressure fluid from a storage tank and feeds it into a high-pressure reservoir. During a braking maneuver, by means of an electrical brake request signal, an electronic control unit switches an electromagnetically actuatable directional-control valve and introduces brake pressure into a cylinder-piston unit in order to press a brake lining against a friction element connected to a vehicle wheel. Since the directional-control valve can only be switched between a pressure increase position and a pressure decrease position, an approximate pressure maintenance can only be achieved by continuously switching the valve between its two positions and therefore brake pressure modulation is not very convenient. In addition, the pressure fluid storage tank requires additional installation space in the actuating unit.

SUMMARY OF THE INVENTION

The actuating unit according to the invention has the advantage over the prior art that its structural volume is relatively low because a pressure fluid storage tank is not required since during a braking maneuver, the same pressure fluid volumes are always exchanged between the two cylinder chambers of the cylinder-piston unit. The actuating unit therefore has a closed hydraulic system. As a result, the actuating unit can be already filled with pressure fluid when it is installed in the motor vehicle. Moreover, the valve can be switched to produce phases for increasing, maintaining, and decreasing brake pressure, where the pump actively supports the brake pressure decrease.

BRIEF DESCRIPTION OF THE DRAWINGS

An exemplary embodiment of the invention is shown in a simplified fashion in the form of a layout of an actuating unit for a wheel brake of a motor vehicle and will be explained in detail below.

DESCRIPTION OF THE PREFERRED EMBODIMENT

The wheels of a motor vehicle, which is not shown in the drawing, are each equipped with an actuating unit 1 for a wheel brake 2. The actuating unit 1, which is shown in the form of a layout, has a cylinder-piston unit 3, whose cylinder 4 has a piston rod 5 passing through its entire length. A piston 6 disposed on this piston rod has the same surface area on both sides. The piston 6 separates two cylinder chambers 7 and 8 in the cylinder 4, which are filled with a hydraulic fluid. On the cylinder chamber 7 side, the piston rod 5 of the cylinder-piston unit 3 acts on at least one brake lining 9, which can be pressed against and lifted away from a friction element 10, which is connected to a vehicle wheel, the friction element being a brake disk in a disk brake.

The actuating unit 1 includes a hydraulic pump 14, which can be driven at variable speeds by an electric motor 13. In addition, a directional-control valve 15 is provided, which is connected between the cylinder-piston unit 3 and the pump 14. This control valve has four connections and three switched positions. A first connection A is connected by a first line 16 to the first cylinder chamber 7 of the cylinder-piston unit 3 oriented toward the brake lining. From a second connection B, a second line 17 leads to the second cylinder chamber 8 of the cylinder-piston unit 3 oriented away from the brake lining. This line 17 is connected to a measuring transducer 18, which is referred to below as a pressure sensor, for measuring the pressure in the cylinder chamber 8. A third connection P of the directional-control valve 15 is connected to the pressure side 20 of the pump 14 by means of a third line 19. From a fourth connection T, a fourth line 21 leads to the suction side 22 of the pump 14. The fourth line 21 is connected to a low-volume pressure fluid compensator reservoir 23, which is sealed off from the atmosphere by an airtight and moisture-tight membrane 24. The directional-control valve 15 has a spring-centered first switched position I (middle position) as well as two electromagnetically actuated switched positions II and III. In the first switched position I, the pressure side 20 of the pump 14 is connected to its suction side 22 and the two connections A and B of the lines 16 and 17 leading to the two cylinder chambers 7 and 8 of the cylinder-piston unit 3 are closed. In the second switched position II, the pressure side 20 of the pump 14 is connected to the second cylinder chamber 8 and the suction side 22 of the pump is connected to the first cylinder chamber 7. In the third switched position III, the pressure side 20 of the pump 14 is connected to the first cylinder chamber 7 of the cylinder-piston unit 3 and the suction side 22 of the pump is connected to the second cylinder chamber 8.

The driver can actuate the actuating unit 1 and the actuating units associated with the other vehicle wheels by means of a brake pedal 27, whose pedal path can be detected by a measuring transducer 28, which is referred to below as a path sensor. In addition, an electronic control unit 29 is provided, which can process the signal that represents an electrical brake request signal of the path sensor 28. The control unit 29 can control the electric motor 13 and the 4/3-port directional-control valve 15 of all of the actuating units 1 of the vehicle. In addition, the control unit 29 can process the signals measured by the pressure sensors 18 of the actuating units 1. Finally, the control unit 29 can process slip-dependent signals, which are detected with wheel rotation sensors, not shown, on the vehicle wheels, for purposes of slip control, e.g. for an antilock brake control, traction control, or stability control of the vehicle.

The actuating unit 1 operates as follows:

When a brake request signal is generated, whether due to brake pedal actuation or the stability control of the vehicle, which is not described in detail here, the control unit 29 switches the electric motor 13 of the pump 14 into operation and switches the directional-control valve 15 from the middle position I into the switched position II. The pump 14 aspirates pressure fluid from the cylinder chamber 7 of the cylinder-piston unit 3 oriented toward brake lining and supplies it into the cylinder chamber 8 oriented away from the brake lining. The piston 6 with the piston rod 5 is slid to toward the left in the drawing and the at least one brake lining 9 is pressed against the friction element 10 as a function of the pump pressure. By means of the variable speed control of electric motor 13, the pressure increase speed can be adjusted as a function of the progression of the brake request signal. The pressure sensor 18 detects the pressure prevailing in the cylinder chamber 8 and its signal is processed in the control unit 29. When the pressure, which is a function of the brake request signal, is achieved in the cylinder chamber 8, the directional-control valve 15 is switched into the position I so that the pressure fluid that the pump 14 supplies in order to maintain the brake pressure, is diverted through the line 21 to the suction side 15 of the pump. In order to partially or completely reduce the pressure in the cylinder chamber 8, the directional-control valve 15 is switched into the switched position III. Due to the elasticity of the wheel brake 2 and the pressure fluid that the pump 14 supplies to the cylinder chamber 7, the piston 6 is reset. The brake lining 9 can be lifted away from the friction element 10 in order to adjust a clearance.

During the entire duration of the braking maneuver, the electric motor 13 is switched on and the pump 14 continuously supplies pressure fluid. The directional-control valve 15 can increase, maintain, and decrease brake force through corresponding pressure increase or pressure decrease in the respective cylinder chamber 7 or 8. The degree of pressure increase and pressure decrease can therefore be adjusted by means of the electric motor 13. With the actuating unit 1, it is also possible to control the brake pressure or the braking force for purposes of slip control during acceleration and braking, for stability control, and for braking independent of the driver. In addition, an auxiliary braking can be produced by virtue of the fact that in the switched position II, brake pressure is introduced into the cylinder chamber 8, the directional-control valve 15 is switched into the switched position I, and the electric motor 13 is switched off.

The pressure fluid compensator reservoir 23 is not required in and of itself for the operation of the actuating unit 1 since the hydraulic system described is a closed system and during a braking maneuver, pressure fluid is merely exchanged between the two cylinder chambers 7 and 8. In practical application, the compensator reservoir 23 can be used to replace pressure fluid lost at sealing points of the cylinder-piston unit 3 or the pump 14 or to compensate for thermally induced volume fluctuations of the pressure fluid in the system. The actuating unit is a self-sufficient system for each vehicle wheel. Advantageously, each actuating unit of the vehicle is connected to a separate power supply or groups of actuating units are connected to separate power supplies. If one power supply fails, the other actuating units remain operational.

What is claimed is:

1. An actuating unit for a wheel brake of an electromechanical wheel brake of a motor vehicle, comprising an electric motor; a hydraulic pump drivable by said electric motor; a cylinder-piston unit pressing at least one brake lining against and lifting the at least one brake lining away from a friction element connectable to a vehicle wheel; a pump; a valve disposed between said pump and said cylinder-piston unit and operative for modulating a pressure in said cylinder piston unit; a control unit processing an electric brake request signal and controlling said valve, said cylinder-piston unit having a piston with a same surface area on both sides and has a cylinder with cylinder chambers disposed on both sides of said piston, said valve having four connections and three switched positions including a first connection connected to a first cylinder chamber oriented toward the brake lining, a second connection connected to a second cylinder chamber oriented away from the brake lining, a third connection connected to a pressure side of said pump, and a fourth connection connected directly to a suction side of said pump, so that in a first switched position the pressure side of said pump is connected to the suction side of said pump and the first and second connections of said first and said second cylinder chambers are closed, in a second switched position the pressure side of said pump is connected to said second cylinder chamber and a suction side of said pump is connected to said first cylinder chamber, and in a third switched position the pressure side of said pump is connected to said first cylinder chamber and said suction side of said pump is connected to said second cylinder chamber; and a measuring transducer located adjacent to said second cylinder chamber in fluid communicating with the latter for directly measuring a pressure in said cylinder chamber oriented away from the brake lining and supplying a signal which is processed in said control unit and which also can control said electric motor with a variable speed.

2. An actuating unit as defined in claim 1, wherein said pump is formed so that it is continuously driven during actuation of a service brake.

3. An actuating unit as defined in claim 1, wherein said valve is controllable as a function of slip signal.

4. An actuating unit as defined in claim 1, and further comprising a pressure fluid compensator reservoir, the suction side of said pump being connected to said pressure fluid compensator reservoir.

\* \* \* \* \*